(12) United States Patent
Arslan et al.

(10) Patent No.: US 9,462,134 B2
(45) Date of Patent: Oct. 4, 2016

(54) METHOD ENABLING VERIFICATION OF THE USER ID BY MEANS OF AN INTERACTIVE VOICE RESPONSE SYSTEM

(71) Applicant: SESTEK SES VE ILETISIM BILGISAYAR TEKNOLOJILERI SANAYII VE TICARET ANONIM SIRKETI, Istanbul (TR)

(72) Inventors: Mustafa Levent Arslan, Istanbul (TR); Ahmet Serdar Karadayi, Istanbul (TR)

(73) Assignee: SESTEK SES VE ILETISIM BILGISAYAR TEKNOLOJILERI SANAYII VE TICARET ANONIM SIRKETI, Istanbul (TR)

( * ) Notice: Subject to any disclaimer, the term of this patent is extended or adjusted under 35 U.S.C. 154(b) by 0 days.

(21) Appl. No.: 14/408,568

(22) PCT Filed: Jul. 12, 2013

(86) PCT No.: PCT/TR2013/000236
§ 371 (c)(1),
(2) Date: Dec. 17, 2014

(87) PCT Pub. No.: WO2014/011131
PCT Pub. Date: Jan. 16, 2014

(65) Prior Publication Data
US 2015/0156328 A1 Jun. 4, 2015

(30) Foreign Application Priority Data
Jul. 12, 2012 (TR) .................. 2012 08176

(51) Int. Cl.
*H04M 1/64* (2006.01)
*H04M 7/00* (2006.01)
*G06F 21/42* (2013.01)
*H04M 3/493* (2006.01)

(52) U.S. Cl.
CPC ............ *H04M 7/0078* (2013.01); *G06F 21/42* (2013.01); *H04M 3/493* (2013.01)

(58) Field of Classification Search
CPC .................................................. H04M 7/0078
See application file for complete search history.

(56) References Cited

U.S. PATENT DOCUMENTS

| | | | | |
|---|---|---|---|---|
| 8,078,881 | B1 * | 12/2011 | Liu | G06F 21/31 713/183 |
| 8,959,596 | B2 * | 2/2015 | Nice | H04L 63/0838 726/5 |
| 9,014,666 | B2 * | 4/2015 | Bentley | G06F 21/34 455/411 |
| 9,032,192 | B2 * | 5/2015 | Frank | H04L 9/3231 713/1 |
| 9,083,687 | B2 * | 7/2015 | Davis | H04L 63/08 |
| 9,177,125 | B2 * | 11/2015 | Steeves | G06F 21/31 |
| 2006/0020816 | A1 * | 1/2006 | Campbell | H04L 63/083 713/182 |

FOREIGN PATENT DOCUMENTS

| | | |
|---|---|---|
| EP | 0444351 A2 | 9/1991 |
| WO | WO2009/039866 A1 | 4/2009 |

* cited by examiner

*Primary Examiner* — Joseph T Phan
(74) *Attorney, Agent, or Firm* — Gokalp Bayramoglu

(57) ABSTRACT

A user ID authentication method, wherein it comprises the process step of realization of a call between the phone number recorded previously in the customer information database (5), and the interactive voice response system (IVR) (1) in the case where a user logs over a web browser (4) into a restricted access system requiring high security such as Internet banking.

12 Claims, 8 Drawing Sheets

METHOD ENABLING VERIFICATION OF THE USER ID BY MEANS OF AN INTERACTIVE VOICE RESPONSE SYSTEM

TECHNICAL FIELD

The present invention relates to an interactive voice response system (IVR) comprising alternative methods for providing verification of the user ID by means of an interactive voice response system to prevent unauthorized access to restricted areas such as Internet banking, etc.

PRIOR ART

Along with the popularization of network communication between electronic devices, realization of the financial, medical and other personal operations using said structures is increasing rapidly. This situation has brought along the requirements of the protection of personal data and prevention of security breaches.

In the existing methods, when the users want to access a restricted area to carry out an operation, they log into the system by using the user name, password or data similar to these, which are solely known by said users. However, this situation allows to easily gain an access to the system by any person having such information, as a result, an adequate protection against unauthorized persons is not provided. Thus, to ensure a more effective protection, logging into the system by means of a single use password (OTP-one time password) generated once for each login of the user to the restricted access resources is provided instead of defining a fixed password therefor. SMS, mobile phones or personal use OTP devices are used for providing the user with OTP and the user is asked to enter the OTP each time he or she logs in. Since the OTP generated once for each tune the user logs into the system constantly changes, the level of risk is reduced and unauthorized access to restricted resources is made difficult. Patents numbered GB 2379040 and EP 1107089 disclose means controlling the access to the remote systems with single use passwords. However, some disadvantages are observed when said means are analyzed.

These disadvantages can be given as the following:
If the OTP password is sent via an SMS, an SMS sending cost is incurred.
In a part of the OTP sent via an SMS A5/x standard is used and it carries the risk of being exploited by malicious people.
In the case of directly generating OTP via mobile phone, there is the risk, of lost or stolen mobile phone. Any person obtaining the phone can discover the OTP password. A similar situation also applies to personal OTP devices.

Today, another technology used for authentication of the user ID is the interactive voice response system (IVR). However, currently, said technology is mainly used to prevent unauthorized access to the databases of the call centers. Such a voice authentication system is disclosed in the application US 2006029190 A1. Said system comprises the most general voice verification/speech recognition methods, wherein in the IVR calls performed by the user such as the ones made to the call centers, the user ID is authenticated by means of the information only known to the user (what you know). Similarly, US 20040029565 A1 is based on the method of authenticating the user ID in the telephone communication systems. In this method, the voice signature of the user is received via IVR and recorded in the database and in the next call, the user is asked to repeat the content of the voice signature (who you are) and this is compared with the voice signature thereof provided in the database. If both voice records match, then operation approval is provided. Another application similar to the two aforementioned United States applications is the JP2008294881 application. This application is also a typical IVR system authenticating the user ID by verification of the user information provided during the call of the user.

None of the above mentioned applications provide a user ID verification opportunity for the restricted access areas such as Internet banking accessed over the web and requiring high security. The user ID can only be verified for the IVR calls requiring access to the information by phone.

In conclusion, all of the aforementioned problems have made it necessary to make an improvement in the relevant art.

OBJECTIVES OF THE INVENTION

The present invention relates to an ID authentication method performed by means of an interactive voice response system, which meets the aforementioned requirements, eliminates all the drawbacks and brings additional advantages.

One objective of the present invention is to introduce a user ID authentication method for authentication of the user ID by controlling at least the phone number of the user in a call realized between the user's recorded phone number and the interactive voice response system (IVR) for preventing unauthorized access to the restricted access areas such as Internet banking, etc.

Another objective of the present invention is to provide a user ID authentication method comprising two alternative structures, i.e. the interactive voice response system can call the user or the user can call the interactive voice response system for verification of the user ID.

Another objective of the present invention is to introduce a user ID authentication method comprising voice technologies such as speech synthesis, speech recognition, voice verification for enabling the user ID to be authenticated by means of a security question and/or analysis of speaker's voice in addition to the verification of the user ID with the recorded phone number.

In order to realize all the advantages, which are mentioned above and will be understood from the following description, the user ID authentication method according to the present invention is characterized in that it comprises the process step of realization of a call between the phone number recorded previously in the customer information database and the interactive voice response system (IVR) in the case where a user logs over a web browser into a restricted access system requiring high security such as Internet banking.

The structural and the characteristic features and all advantages of the present invention will be understood more clearly with the following figures and the detailed description written by referring to said figures and therefore, the evaluation needs to be done by taking said figures and the detailed description into consideration.

BRIEF DESCRIPTION OF THE FIGURES

Embodiment of the present invention and advantages thereof with the additional components must be considered together with the figures explained below in order to be fully understood.

REFERENCE NUMBERS

Figure 1:
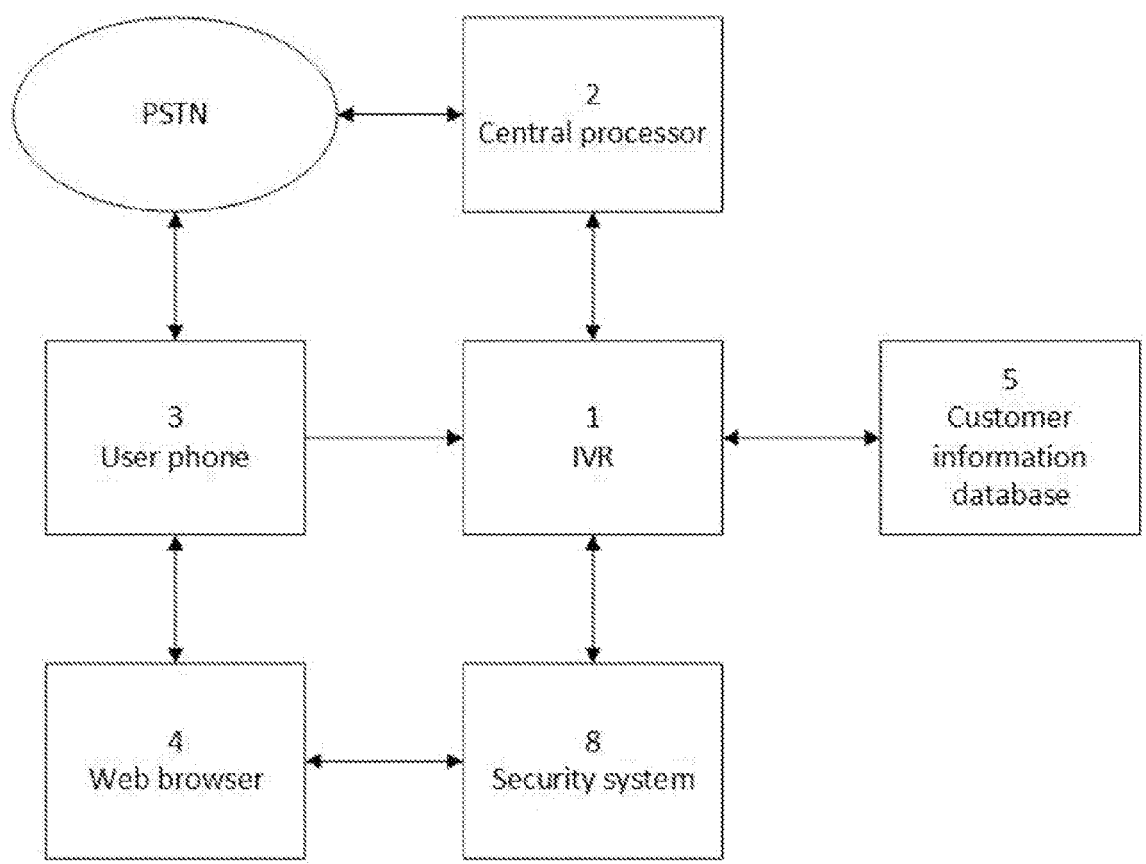
FIG. 1: A schematic view of an alternative embodiment of the interactive voice response system (IVR) according to the present invention without voice technologies is given, wherein said interactive voice response system (IVR) calls the user.

1. Interactive Voice Response System (IVR)
2. Central Processor
3. User Phone
4. Web Browser
5. Customer Information Database
6. Voice Signature Database
7. Voice Recorder
8. Security System
9. Text To Speech Module (TTS)
10. Speech Recognition Module (SR)
11. Voice Verification Module (W)

DETAILED DESCRIPTION OF THE INVENTION

In this detailed description, preferred embodiments of the interactive voice response system (1) according to the present invention are described only for a better understanding of the subject without constituting any restrictive effect. Accordingly, in the following description and figures, a user ID authentication system comprising alternative methods for providing verification of the user ID by means of an interactive voice response system (1) to prevent unauthorized access to restricted areas is disclosed.

Following are the basic elements of the system according to the present invention. An interactive voice response system (IVR) (1) where the required operations are performed for ID authentication of the user logging into a restricted access area;

A user phone (3) serving as a user terminal enabling the user to connect to the interactive voice response system (1) and to realize the required operations over the interactive voice response system (1);

A central processor (2) enabling the realization of the communication between the interactive voice response system (1) and the user phone (3);

A web browser (4) through which the user connects to a restricted access area of the respective organization to perform the operation;

A customer information database (5) of the respective organization containing the customer information such as user name, password, phone number, security question, etc.; and A security system (8) of the respective organization providing operation approval or rejection by the evaluation in accordance with the data input into the interactive voice response system (1) by the user.

The ID authentication application with the interactive voice response system (1) according to the present invention can be principally carried out in two different ways.

The first system is the one where the interactive voice response system (1) automatically calls the user, wherein in said system, when the user requests to log into the account thereof in the respective organization over the web browser (4), an IVR (1) call will be automatically made to the user's recorded phone number. The system where IVR (1) calls the user can be optionally designed as a system with and/or without voice technologies.

Figure 2:
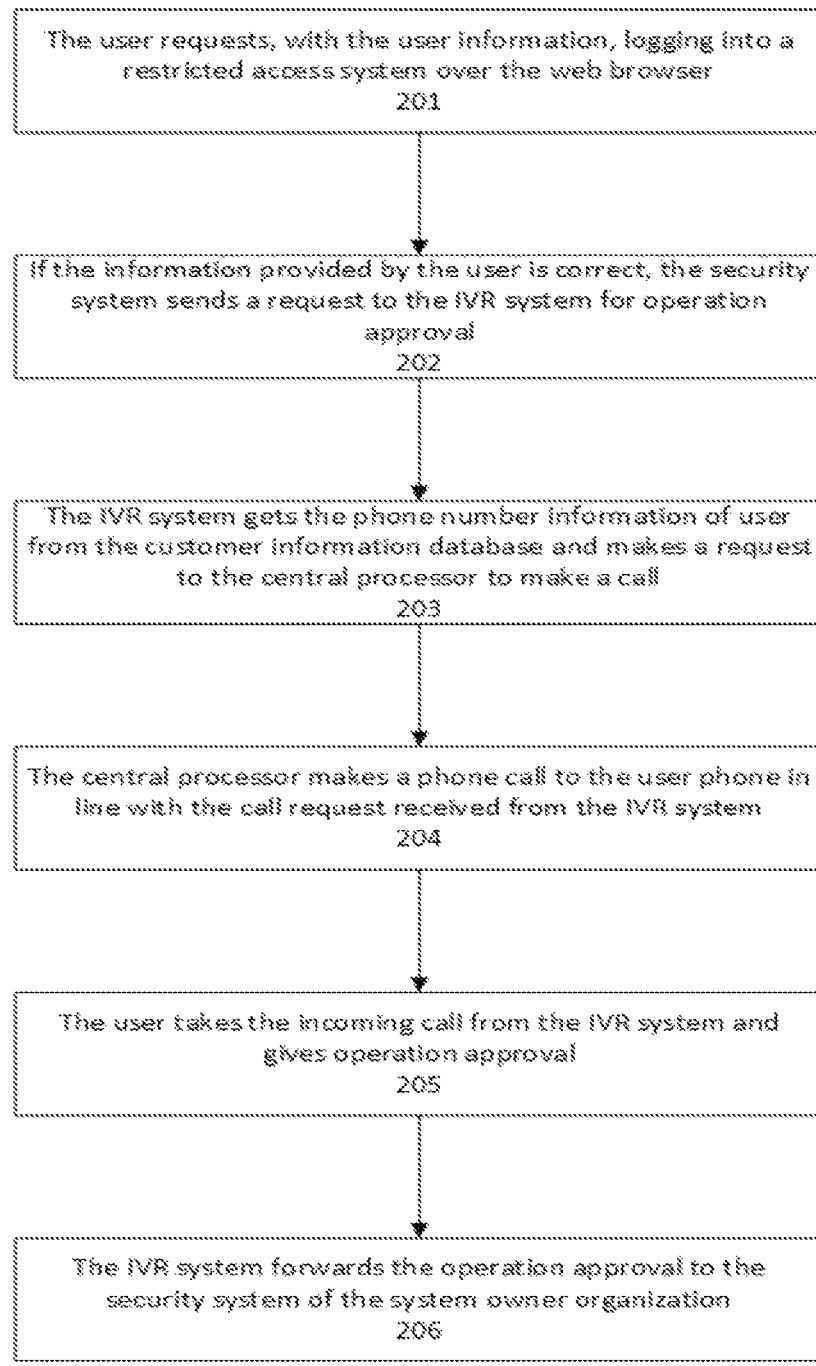
FIG. 2: A process flow diagram of an alternative embodiment of the interactive voice response system (IVR) according to the present invention without voice technologies is given, wherein said interactive voice response system (IVR) calls the user.

In FIG. 1, a schematic view of the system without voice technologies is illustrated, wherein the interactive voice response system (1) calls the user. In this system, when the user logs into the system, the interactive voice response system (1) rings the user number recorded in the database (5) and operation approval is carried out. In FIG. 2, a flow diagram of the mode of operation of the method implemented in said system is given. Accordingly, the system comprises the following process steps:

The user requests, with the user information, logging into a restricted access system requiring high security over the web browser (4) of the organization through which said user wants to perform an operation;

The security system (8) of the respective organization where the operation is to be carried out sends a request to the interactive voice response system (1) for operation approval if the information provided by the user is correct;

The interactive voice response system (1) gets the user's phone number information from the customer information database (5) and makes a request to the central processor (2) to make a call;

The central processor (2) makes a phone call to the user phone (3) in accordance with the call request received from the interactive voice response system (1);

The IVR (1) requests from the user an operation approval with an expression such as 'if you approve the operation press 1, if you don't approve the operation press 2', etc.;

The user takes the incoming call from the interactive voice response system (1) and gives operation approval;

The interactive voice response system (1) forwards the operation approval to the security system (8) of the system owner organization; and The user accesses the account thereof in the respective organization and performs the desired operations.

With this method, even if the user name and password is obtained by malicious people, the level of security will be taken one step further since the final approval is provided by a personal phone (3). Call of said interactive voice response system (1) will take place on the basis of seconds. In many countries, including Turkey, the cost of the calls made on the basis of seconds is lower than the cost of SMSs.

Figure 3:
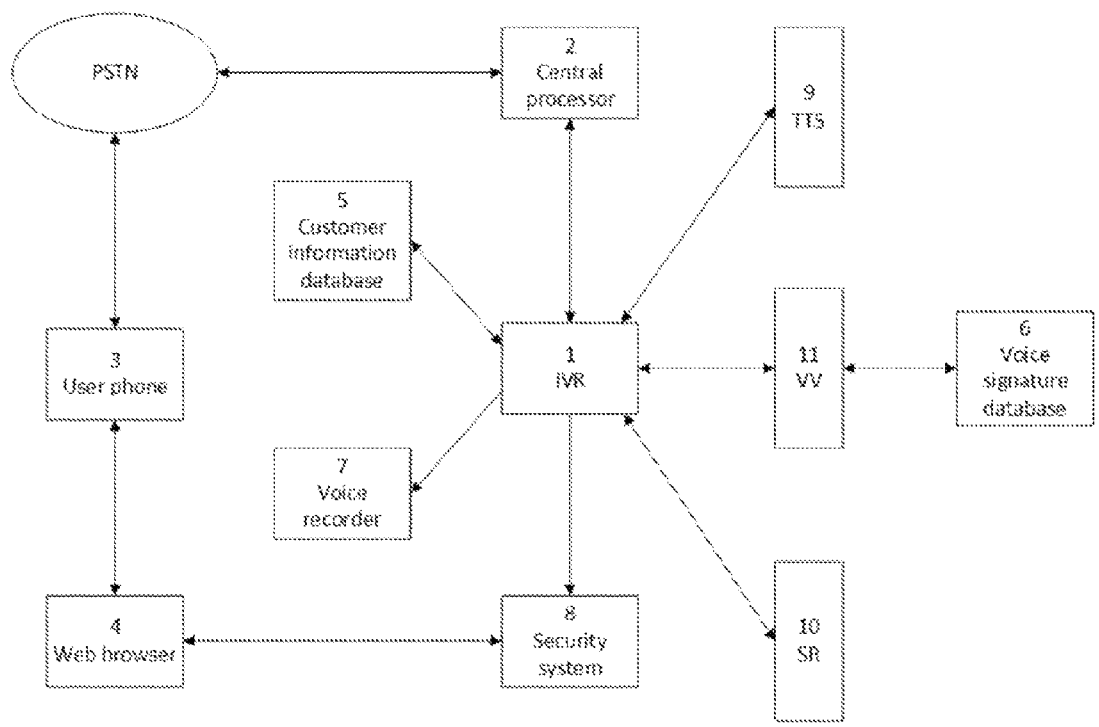
FIG. 3: A schematic view of an alternative embodiment of the interactive voice response system (IVR) according to the present invention with voice technologies is given, wherein said interactive voice response system (IVR) calls the user.

In FIG. 3, a system with integrated voice technologies is disclosed, wherein the interactive voice response system (1) calls the user. Said system is provided therein with a speech synthesis module (9), a speech recognition module (10) and/or a voice verification module (11) for verification of the user ID by means of voice technologies. Optionally, said modules can be used separately or together.

Verification of the user ID can be carried out in two different ways. In the first method, the user will be asked to set up a security question and answer known thereby. Question templates can be fixed as well as the customer can create their own question. After the user provides correct user name and password to the web browser (4), he or she will be automatically called by the interactive voice response system (1). During the call, the security question previously set up by the user will be read to the user by the text to speech (TTS) module (9). The user will speak the answer of the question to the interactive voice response system (1) within the limited period of time to be set. The answer received from the user will be converted into text by means of the speech recognition (SR) (10). The interactive voice response system (1) will verify the answer converted into text by comparing it to the correct answer provided in the customer information database (5). The other method can be used alone or together with the method described above by using the voice verification module (11). In this method, the users will be asked to leave a voice signature in the system by repeating a particular sentence and thus, a voice signature database (6) will be created. During the call of the interactive voice response system (1), the user will be asked to repeat a random sentence and the user voice will be compared to the recorded voice signature by using the voice verification (W) module (11). Thus, the user ID will be approved upon the biometric identification thereof. Voice authentication can be made by asking the user to repeat a random sentence or by the answer thereof provided for the security question.

Figure 4:
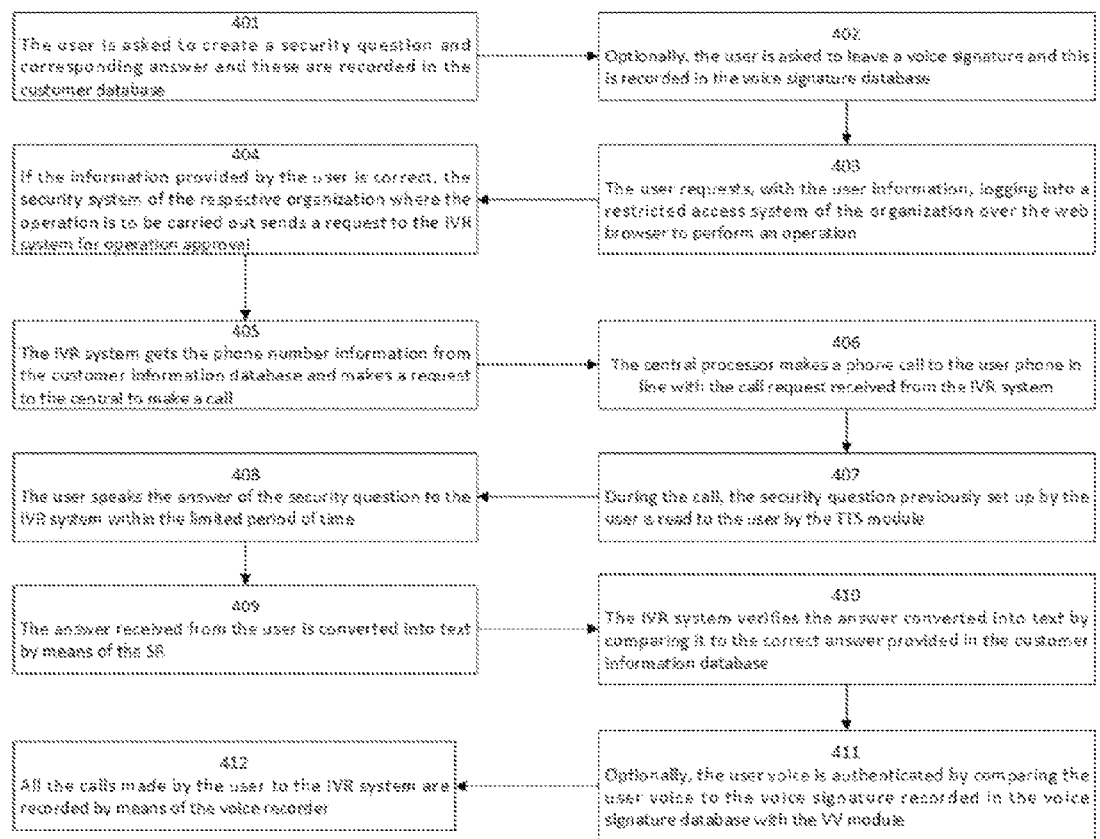
FIG. 4: A process flow diagram of an alternative embodiment of the interactive voice response system (IVR) according to the present invention with voice technologies is given, wherein said interactive voice response system (IVR) calls the user.

In FIG. 4, a flow diagram of the mode of operation of such a system described above is given. Accordingly, the system comprises the following process steps:

The user is asked to create a security question and answer and these are recorded in the customer database (5);

Optionally, the user is asked to leave a voice signature sample and this is recorded in the voice signature database (6);

The user requests, with the user information, logging into a restricted access system requiring high security over the web browser (4) of the organization through which said user wants to perform an operation;

The security system (8) of the respective organization where the operation is to be carried out sends a request to the interactive voice response system (1) for operation approval if the information provided by the user is correct;

The interactive voice response system (1) gets the user's phone number information from the customer information database (5) and makes a request to the central processor (2) to make a call;

The central processor (2) makes a phone call to the user phone (3) in accordance with the call request received from the interactive voice response system (1);

During the call, the security question previously set up by the user is read to the user by text to speech (TTS) module (9);

The user speaks the answer of the security question to the interactive voice response system (1) within the limited period of time;

The answer received from the user is converted into text by means of the speech recognition (SR) (10);

The interactive voice response system (1) verifies the answer converted into text by comparing it to the correct answer provided in the customer information database (5);

Optionally, the user voice is verified by comparing the user voice to the sample voice thereof provided in the voice signature database (6) with the voice verification module (11);

If the user ID is approved, the interactive voice response system (1) accordingly provides such information to the security system (8); and All the calls made by the user to the interactive voice response system (1) are recorded by means of the voice recorder (7).

This method will improve the existing technology and provide a comprehensive and an accurate authentication. The security problems encountered in the current systems will be avoided. Even if the user loses the mobile phone thereof, access to the system by malicious people will not be possible since the user can access said system with only his or her own voice.

All the calls made by the user to the interactive voice response system (1) are recorded by means of a voice recorder (7), thus, they would be retrospectively used as a reference when required. Since the call record is regarded as a proof of operation approval, it will assure the organization offering the system as much as the customer in the event that the customer asserts the contrary.

Another system comprising the ID authentication with the interactive voice response system (1) according to the present invention is the system where the user calls the interactive voice response system (1). In this system, during the logging of the user into a system requiring high security, the user is asked to call the interactive voice response system (1) within a limited period of time. It can be optionally designed as a system with or without voice technologies as in the first system.

Figure 5:
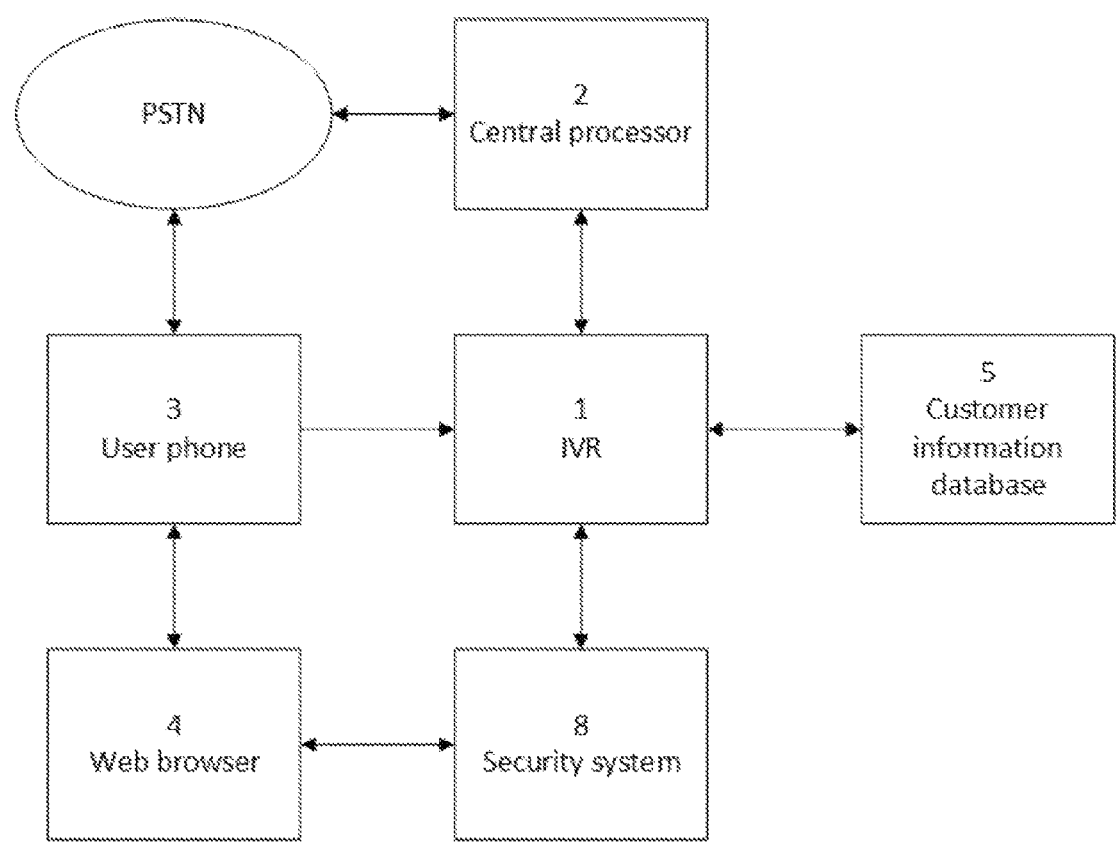
FIG. 5: A schematic view of an alternative embodiment of the interactive voice response system (IVR) according to the present invention without voice technologies is given, wherein the user calls said interactive voice response system (IVR).
Figure 6:
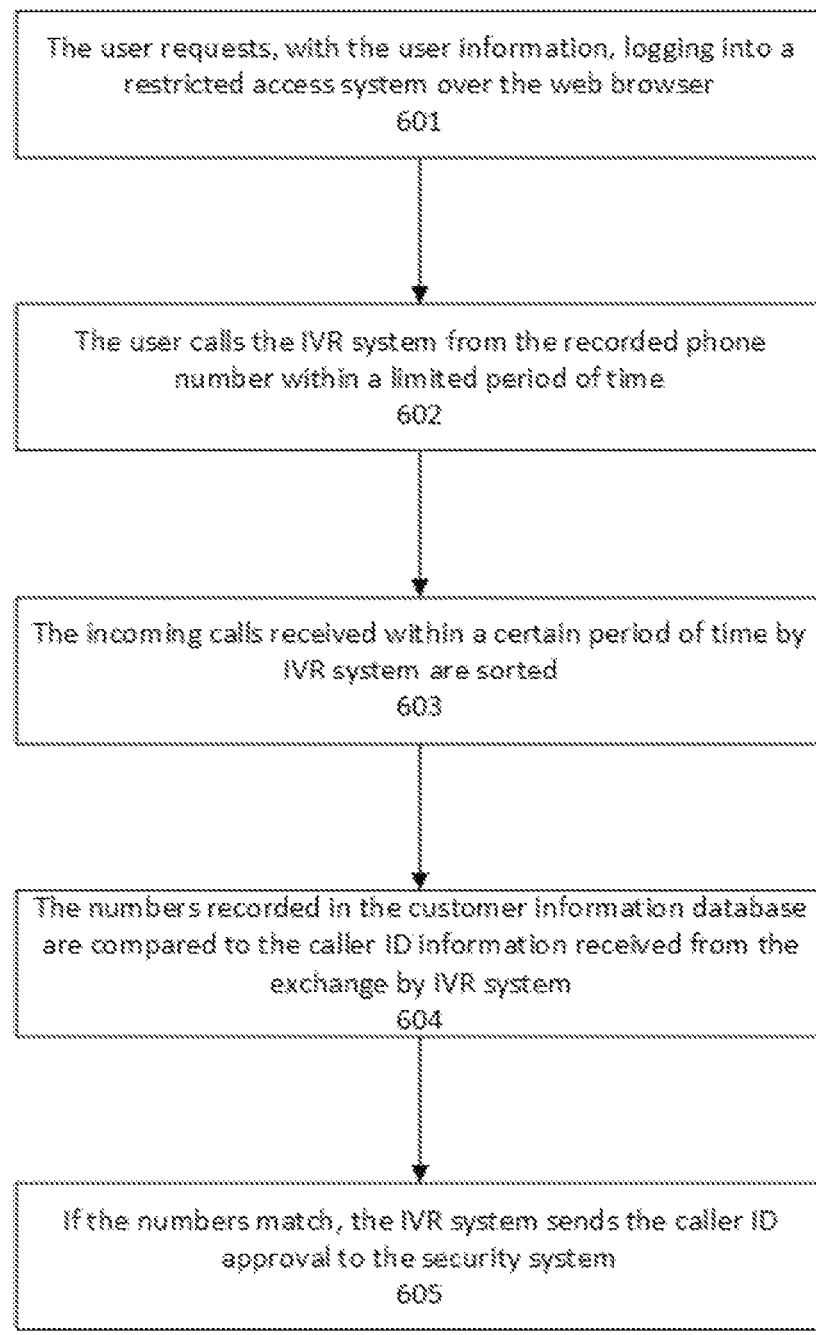
FIG. 6: A process flow diagram of an alternative embodiment of the interactive voice response system (IVR) according to the present invention without voice technologies is given, wherein the user calls said interactive voice response system (IVR).

In FIG. 5, a schematic view of the system without voice technologies is illustrated, wherein the user calls the interactive voice response system (1). In FIG. 6, a flow diagram of the mode of operation of said system is given. Accordingly, the system comprises the following process steps:

The user requests, with the user information, logging into a restricted access system requiring high security over the web browser (4) of the organization through which said user wants to perform an operation;

The user calls the IVR (1) from the recorded phone number within a limited period of time;

The incoming calls received within a certain period of time by the interactive voice response system (1) are sorted;

According to the call order, the recorded numbers in the customer information database (5) are compared to the caller ID information received from the exchange by the interactive voice response system (1);

If the numbers match, the interactive voice response system (1) sends the caller ID approval to the security system (8): and The user logs into the system.

In this method, since the call is not answered by any means, the system will not have any cost. Thus, no additional cost for the ID authentication process will be incurred. Since other than the user name and password the personal phone will be added to the security circle, the system will be a more reliable system than the existing structures.

Figure 7:
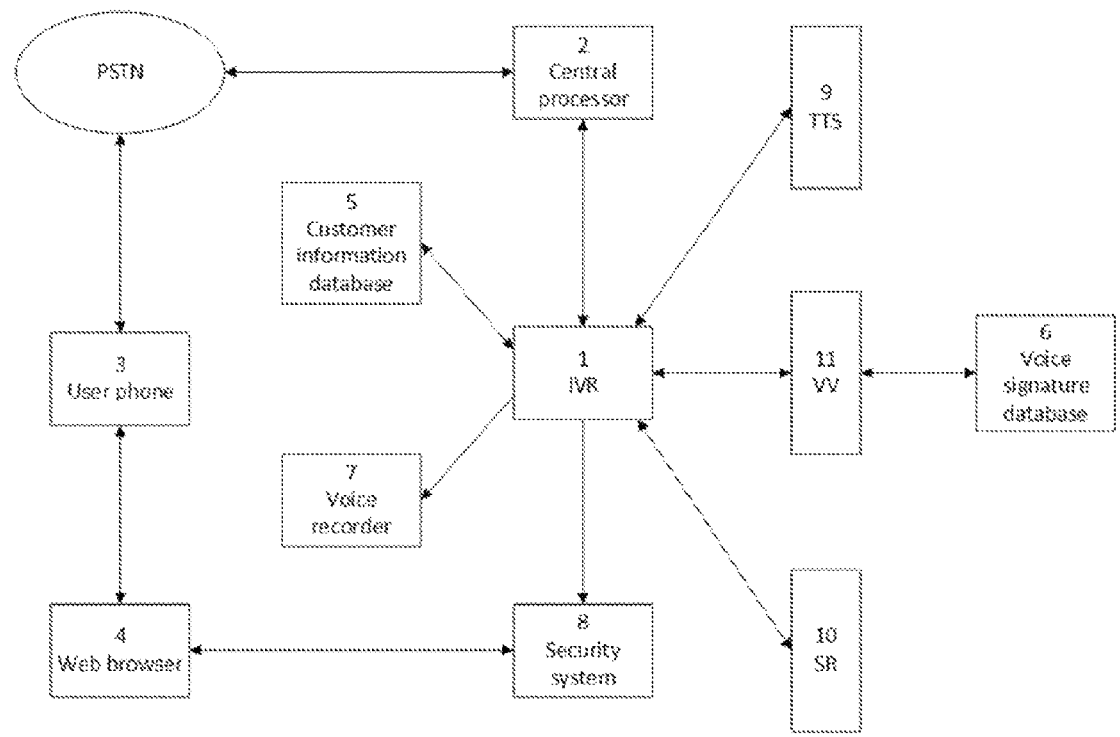
FIG. 7: A schematic view of an alternative embodiment of the interactive voice response system (IVR) according to the present invention with voice technologies is given, wherein the user calls said interactive voice response system (IVR).
Figure 8:
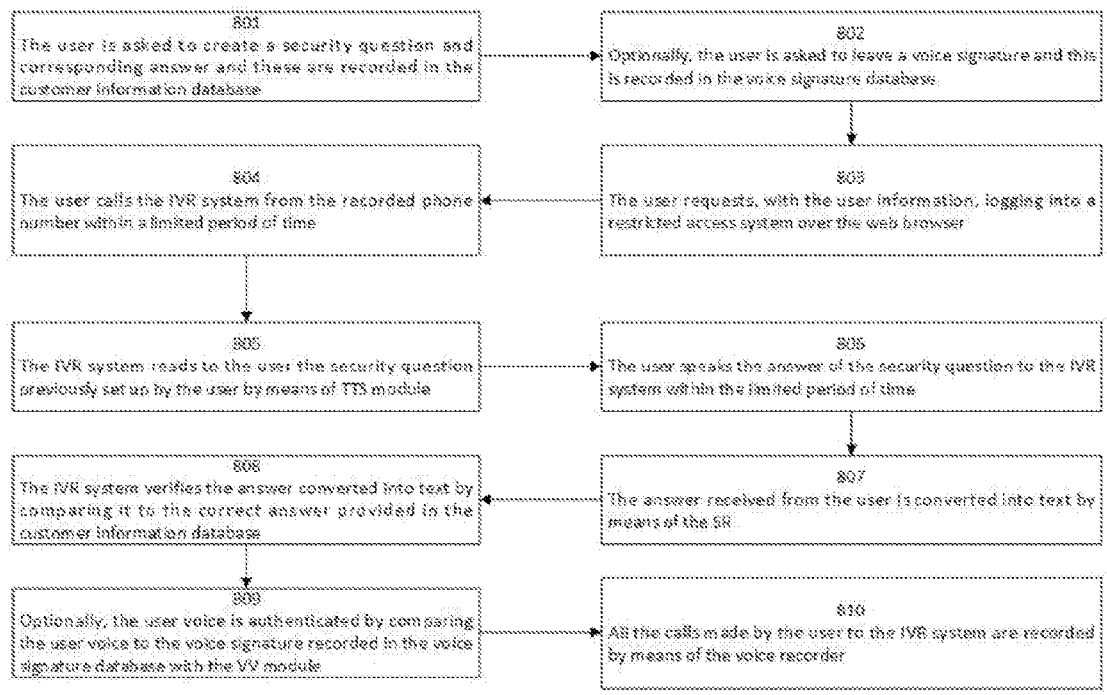
FIG. 8: A process flow diagram of an alternative embodiment of the interactive voice response system (IVR) according to the present invention with voice technologies is given, wherein the user calls said interactive voice response system (IVR).

In FIG. 7, a system with integrated voice technologies is disclosed, wherein the user calls interactive voice response system (1). Said system is also provided therein with a speech synthesis module (9), a speech recognition module (10) and/or a voice verification module (11) for verification of the user ID by means of voice technologies. Optionally, said modules (9, 10, 11) can be used separately or together. In FIG. 8, a flow diagram of the mode of operation of such a system is given. Accordingly, the system comprises the following process steps:

The user is asked to create a security question and answer and these are recorded in the customer information database (5);

Optionally, the user is asked to leave a voice signature and this is recorded in the voice signature database (8);

The user requests, with the user information, logging into a restricted access system requiring high security over the web browser (4);

The user calls the interactive voice response system (1) from the recorded phone number within a limited period of time;

The interactive voice response system (1) reads to the user the security question previously set up by the user by means of the text to speech (TTS) module (9);

The user speaks the answer of the security question to the interactive voice response system (1) within the limited period of time;

The answer received from the user is converted into text by means of the speech recognition (SR) (10);

The interactive voice response system (1) verifies the answer converted into text by comparing it to the correct answer provided in the customer information database (5);

Optionally, the user voice is authenticated by comparing the user voice to the recorded voice signature provided in the voice signature database (6) with the voice verification module (11); and If the user ID is approved, the interactive voice response system (1) accordingly provides such information to the security system (8).

The inventive interactive voice response systems (1) comprising voice technologies provide ID authentication in line with the answers provided to all of the three questions of what does the individual have, what does the individual know, who is the individual. On one hand, the element (phone number) that the user has will be verified by the user answering/making the call from the recorded phone number, on the other hand what he or she knows will be checked from the answer thereof to the security question. Thus, a three factor user ID authentication possibility will be provided and the security level will be taken several steps further.

The invention claimed is:

1. A user ID authentication method, comprising:
S100: realizing a call between a user phone number stored in a customer information database and an interactive voice response system (IVR) in a case where a user logs into a restricted access system requiring high security using a web browser;
S110: logging into a restricted access system requiring high security using the web browser with a user information, wherein the user information is stored in the customer information database;
S120: verifying the user information with a security system of an organization connected to the web browser;
S130: sending an operation approval signal to the IVR after the user information has been authenticated;
S140: retrieving the user phone number from the customer information database corresponding to the operation approval signal and creating a call request by means of a central processor of the IVR;
S150: placing the call to the user phone number in accordance with the call request created by the central processor of the IVR;
S160: requiring the user to answer the call from the IVR;
S170: transmitting an authentication approval signal to the security system by the IVR.

2. The user ID authentication method according to claim 1, wherein step S160 further comprises a step of:
S162: analyzing the voice of the user by means of a plurality of voice technologies for authentication of the user ID.

3. The user ID authentication method according to claim 2, wherein step S162 further comprises the following steps:
S1621: reading a security question to the user by a text to speech (TTS) module during the call, wherein the security question and a first answer to the security question are predetermined by the user and stored in the customer information database;
S1622: expressing a second answer to the IVR within a limited period of time, wherein the limited period of time is predetermined by the user or the IVR;
S1623: converting the second answer received from the user into text by means of a speech recognition (SR) module;
S1624: comparing the second answer which is converted into text with the first answer provided in the customer information database by the IVR; and
S1625: confirming that if the second answer is correct, the IVR accordingly provides the authentication approval signal to the security system.

4. The user ID authentication method according to claim 3, wherein before step S110, the method further comprises the following step:
S109: creating a voice signature by the user and recording the voice signature in a voice signature database.

5. The user ID authentication method according to claim 4, wherein the step S1624 further comprises the following step:
S16241: comparing the voice of the second answer provided by the user to the interactive voice response system with the recorded voice provided in the voice signature database by a voice verification module.

6. The user ID authentication method according to claim 2, wherein all the calls made from the user to the interactive voice response system are recorded by means of a voice recorder.

7. A user ID authentication method comprising the following steps:
S200: realizing a call between a user phone number stored in a customer information database and an interactive voice response system (IVR) in a case where a user logs into a restricted access system requiring high security using a web browser;

S210: logging into a restricted access system requiring high security using the web browser with a user information, wherein the user information is stored in the customer information database;

S220: placing a call to the IVR by the user from the user phone number which is stored in the customer information database within a limited period of time, wherein the limited period of time is predetermined by the user or the IVR;

S230: sorting the calls received by the IVR from different users in chronological order;

S240: comparing the user phone number stored in the customer information database with a caller ID information received from a central exchange by the IVR according to the chronological order; and S250: confirming that if the caller ID information matches the user phone number, then sending an authentication approval signal from the IVR to the security system.

8. The user ID authentication method according to claim 1, wherein step S230 further comprises a step of:

S231: analyzing the voice of the user by means of a plurality of voice technologies for authentication of the user ID.

9. The user ID authentication method according to claim 8, wherein the step S231 further comprising the following steps:

S2311: reading a security question to the user by a text to speech (TTS) module during the call, wherein the security question and a first answer to the security question are predetermined by the user and stored in the customer information database;

S2312: expressing a second answer to the IVR within a limited period of time, wherein the limited period of time is predetermined by the user or the IVR;

S2313: converting the second answer received from the user into text by means of a speech recognition (SR) module;

S2314: comparing the second answer which is converted into text with the first answer provided in the customer information database by the IVR; and S2315: confirming that if the second answer is correct, the IVR accordingly provides the authentication approval signal to the security system.

10. The user ID authentication method according to claim 8, wherein before step S210, the method further comprising a step as follows:

S209: creating a voice signature by the user and recording the voice signature in a voice signature database.

11. The user ID authentication method according to claim 10, wherein the step S2314 further comprises the following step:

comparing the voice of the second answer provided by the user to the IVR with the recorded voice provided in the voice signature database by a voice verification module.

12. The user ID authentication method according to claim 8, wherein all the calls made by the user to the IVR are recorded by means of a voice recorder.

* * * * *